United States Patent
Chang et al.

(10) Patent No.: US 10,753,384 B1
(45) Date of Patent: Aug. 25, 2020

(54) SUCTION CUP

(71) Applicant: TEN SHENG ASSORTED HOUSEWARE CO., LTD., Taichung (TW)

(72) Inventors: Tsung-Chih Chang, Taichung (TW); Yuan-Po Chang, Taichung (TW)

(73) Assignee: TEN SHENG ASSORTED HOUSEWARE CO., LTD., Taichung (TW)

( * ) Notice: Subject to any disclaimer, the term of this patent is extended or adjusted under 35 U.S.C. 154(b) by 0 days.

(21) Appl. No.: 16/270,103

(22) Filed: Feb. 7, 2019

(51) Int. Cl.
*F16B 47/00* (2006.01)
*F16K 15/14* (2006.01)

(52) U.S. Cl.
CPC .............. *F16B 47/00* (2013.01); *F16K 15/14* (2013.01)

(58) Field of Classification Search
CPC ........................................................ F16B 47/00
USPC .................. 248/205.8, 363, 205.7, 205.9
See application file for complete search history.

(56) References Cited

U.S. PATENT DOCUMENTS

| | | | | |
|---|---|---|---|---|
| 3,365,161 A * | 1/1968 | Deitch | ..................... | B25H 3/00 248/317 |
| 3,593,983 A * | 7/1971 | Csenyi | ................... | E04G 15/061 269/1 |
| 4,593,947 A * | 6/1986 | Yocum | ................... | B25B 11/007 294/187 |
| 4,941,635 A * | 7/1990 | Lan | ........................ | A47G 23/03 248/205.9 |
| 7,124,987 B2 * | 10/2006 | Zschiedrich | ............ | F16B 47/00 248/205.9 |
| 7,753,324 B2 * | 7/2010 | Chien | ................... | A47K 17/022 248/205.8 |
| 8,376,295 B2 * | 2/2013 | Hao | ......................... | F16B 47/00 248/205.5 |
| 8,480,044 B2 * | 7/2013 | Liao | ........................ | F16B 47/00 248/205.5 |
| 8,681,492 B2 * | 3/2014 | Fan | .......................... | F16B 47/00 248/205.5 |
| 8,757,418 B2 * | 6/2014 | Zimmerman | ............ | A47G 7/06 220/483 |
| 9,664,227 B2 * | 5/2017 | Huang | ................... | F16B 47/006 |
| 9,803,682 B1 * | 10/2017 | Chang | ..................... | F16B 47/00 |
| 9,950,432 B1 * | 4/2018 | Huang | ................. | B25J 15/0641 |
| 10,030,690 B2 * | 7/2018 | Liu | .......................... | F16B 47/00 |

(Continued)

FOREIGN PATENT DOCUMENTS

TW            I604134 B        11/2017

*Primary Examiner* — Bradley Duckworth
(74) *Attorney, Agent, or Firm* — Muncy, Geissler, Olds & Lowe, P.C.

(57) ABSTRACT

A suction cup is provided, including: a suction member, a first check valve and a second check valve. The suction member includes a seat body, a control member movably disposed on the seat body, a first flow channel and a second flow channel. The seat body includes a seat portion and a cup portion which is elastically deformable and disposed on the seat portion. The seat body has a first gas chamber, and a second gas chamber is defined between the control member and the seat body. The first flow channel is communicated with first gas chamber and the second gas chamber. The first check valve is disposed within the first flow channel and openably closes the first flow channel. The second check valve is disposed within the second flow channel, openably closes the second flow channel.

9 Claims, 6 Drawing Sheets

(56) References Cited

U.S. PATENT DOCUMENTS

| | | | | |
|---|---|---|---|---|
| 10,520,009 | B2* | 12/2019 | Smith | A63H 3/50 |
| 2007/0262598 | A1* | 11/2007 | Schaaf | B25J 15/0616 |
| | | | | 294/189 |
| 2014/0197288 | A1* | 7/2014 | Yang | F16B 47/006 |
| | | | | 248/205.9 |
| 2014/0263894 | A1* | 9/2014 | Chen | F16B 47/00 |
| | | | | 248/205.9 |
| 2015/0240862 | A1* | 8/2015 | Shi | F16B 47/00 |
| | | | | 248/205.8 |

\* cited by examiner

SUCTION CUP

BACKGROUND OF THE INVENTION

Field of the Invention

The present invention relates to a suction cup.

Description of the Prior Art

A suction cup is disclosed in Taiwan Patent No. I604134, including a suction member, a check valve which is disposed in the suction member, an exterior cover unit which is connected to the suction member and a manual exhaust valve which is disposed in the exterior cover unit. The suction member includes a protrusive seat and an gas storage chamber, and the check valve is disposed within a valve hole of the protrusive seat and allows gas to be released from the gas storage chamber to an outside of the protrusive seat. The exterior cover unit includes a gas storage space which is communicated with the gas storage chamber and an outlet channel which is communicated with an outside of the suction cup through the gas storage space. The manual exhaust valve can change a state of the outlet channel from close to open. A pressing member of the manual exhaust valve has an airtight ring sleeved thereon and an indicating segment. The airtight ring is movable relative to the pressing member or the airtight ring is deformable so that the airtight ring can unseal or seal the outlet channel by operating the pressing member. The indicating segment is located in the suction member when air pressure inside the suction cup is lower than the outside of the suction cup, and the indicating segment is gradually revealed out of the suction member when the air pressure inside the suction cup is increased so that a user can identify the level of vacuum inside the suction cup. The suction cup further includes a spring which is elastically abutted against and between the pressing member and the exterior cover unit.

A conventional airtight ring should be deformable for exhaust so that the conventional airtight ring should not be too thick or too hard. However, the airtight ring has to bear elastic force of the spring. Although the pressure inside the suction cup is lower than the outside of the suction cup (for example, a pressure is 0.533 bar), the airtight ring is pushed and moved by the elastic force of the spring and the indicating segment is revealed out of the suction member, which results in erroneous observation.

The present invention is, therefore, arisen to obviate or at least mitigate the above-mentioned disadvantages.

SUMMARY OF THE INVENTION

The main object of the present invention is to provide a suction cup which has preferable and stable suction ability.

To achieve the above and other objects, the present invention provides a suction cup, including: a suction member, including a seat body, a control member which is movably disposed on the seat body, a first flow channel and a second flow channel, the seat body including a seat portion and a cup portion which is elastically deformable and disposed on the seat portion, the cup portion being configured to contact a surface, the seat body having a first gas chamber, a second gas chamber being defined between the control member and the seat body, the first flow channel being communicated with the first gas chamber and the second gas chamber, the control member having the second flow channel; a first check valve, disposed within the first flow channel and openably closing the first flow channel, the first check valve allowing fluid to flow from the first gas chamber to the second gas chamber; a second check valve, disposed within the second flow channel and openably closing the second flow channel, the second check valve allowing fluid to flow from the second gas chamber to an outside of the suction cup.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 2A is a stereogram of a second check valve of a preferable embodiment of the present invention;

FIG. 2B is a stereogram of a cap of a preferable embodiment of the present invention;

DETAILED DESCRIPTION OF THE PREFERRED EMBODIMENTS

Figure 1:
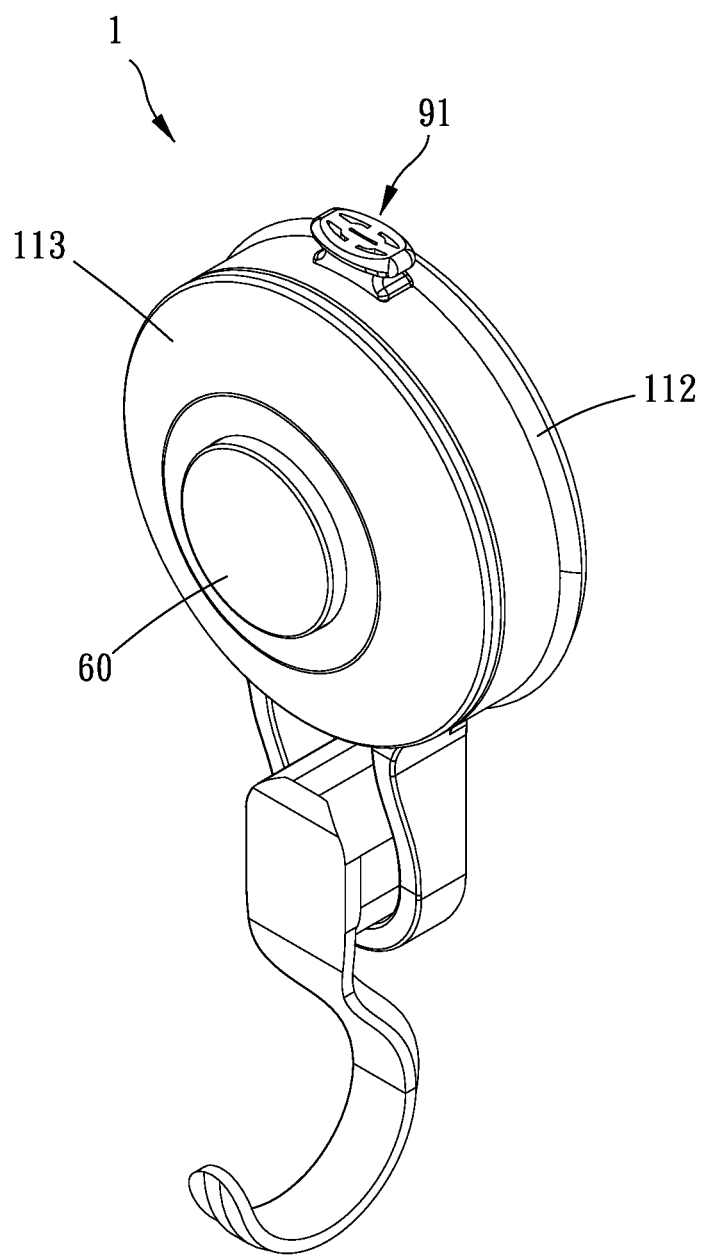
FIG. 1 is a stereogram of a preferable embodiment of the present invention.
Figure 2:
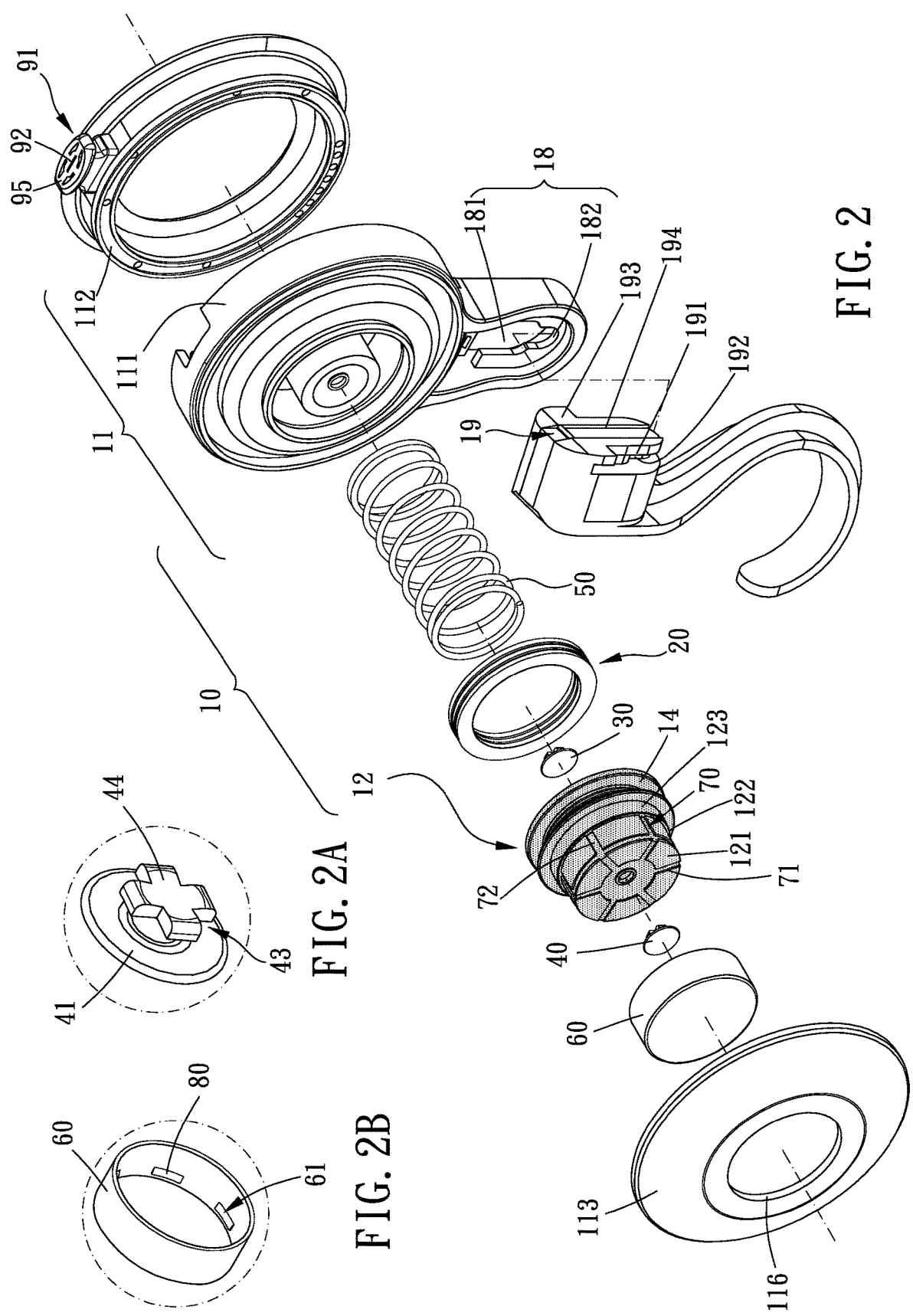
FIG. 2 is a breakdown drawing of a preferable embodiment of the present invention.
Figure 3:
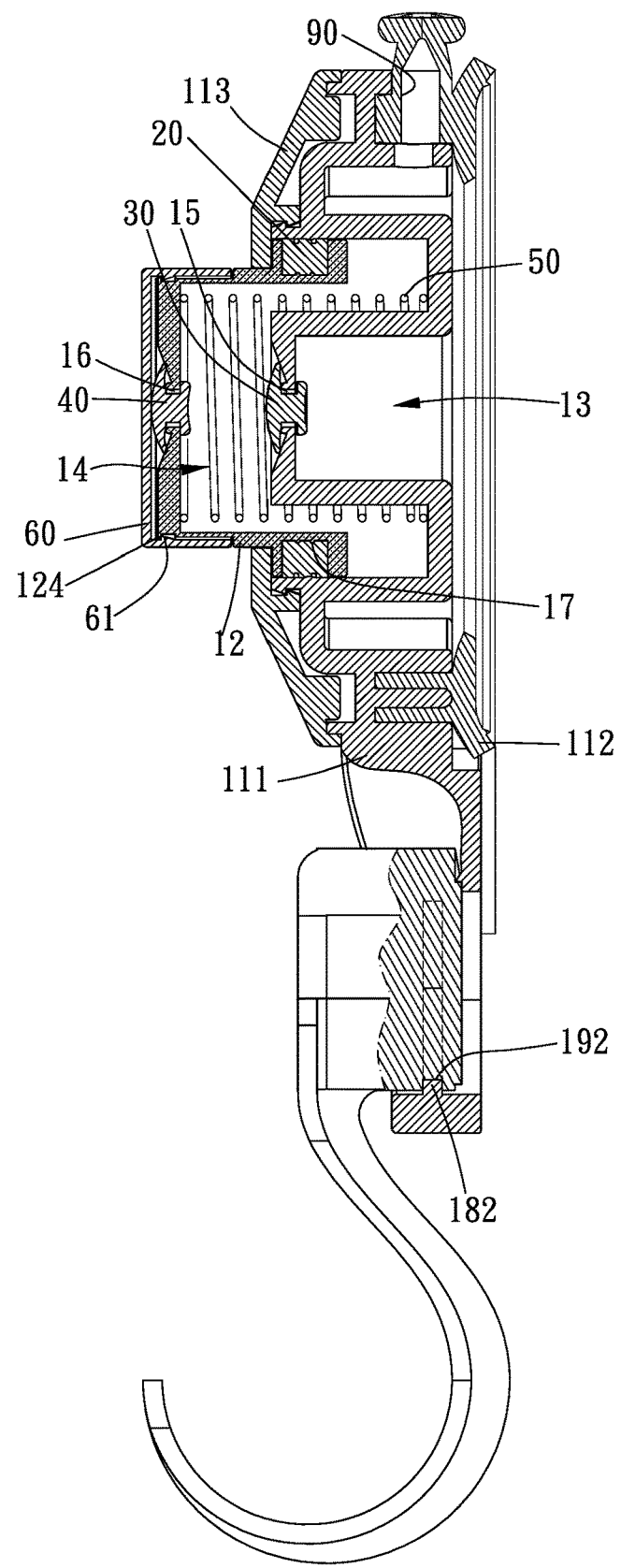
FIG. 3 is a cross-sectional view of a preferable embodiment of the present invention.
Figure 3A:
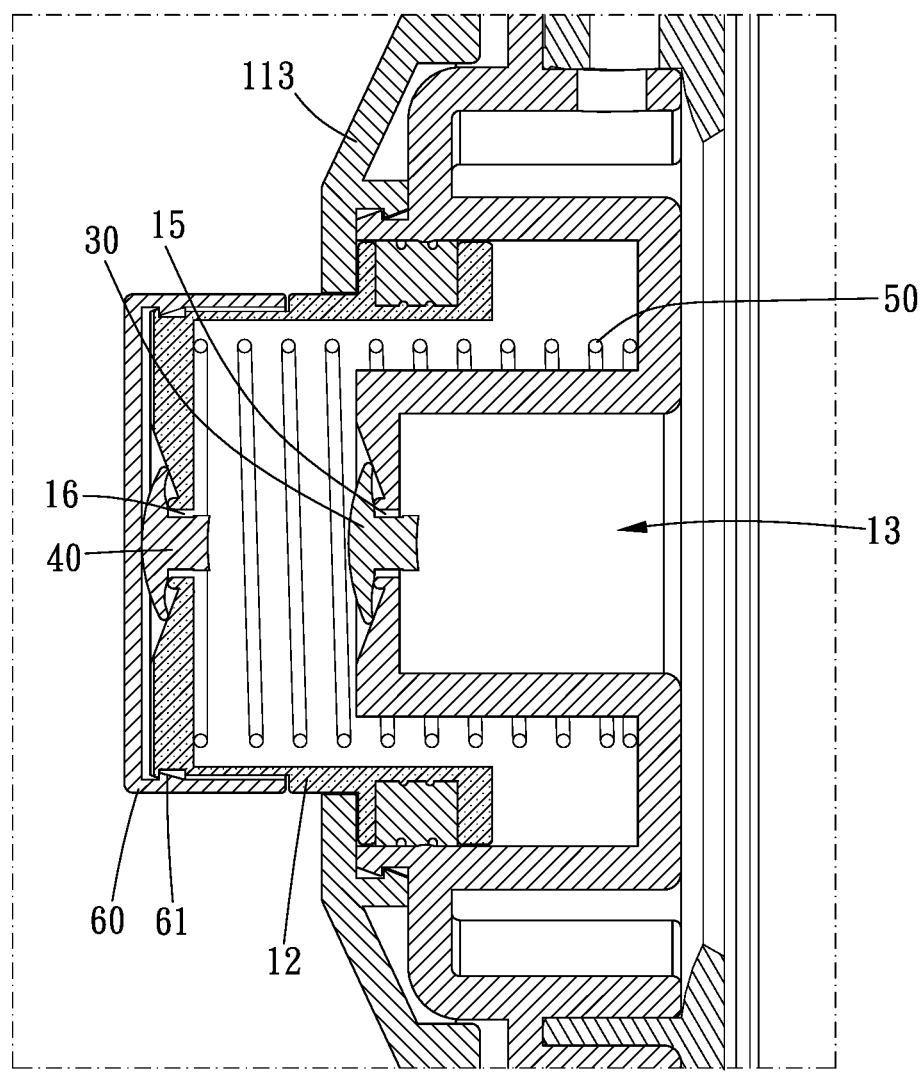
FIG. 3A is a partial enlargement of FIG. 3.
Figure 4:
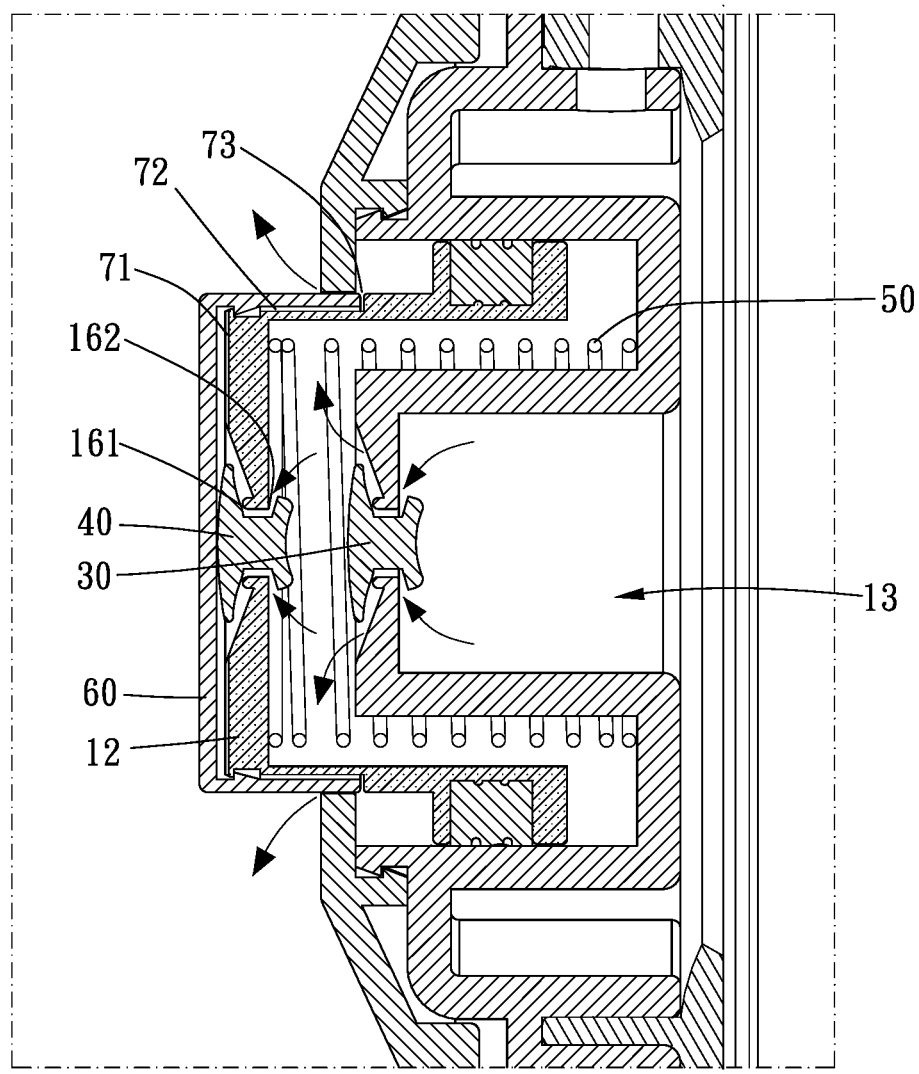
FIG. 4 is a schematic diagram of a preferable embodiment of the present invention in use.
Figure 5B:
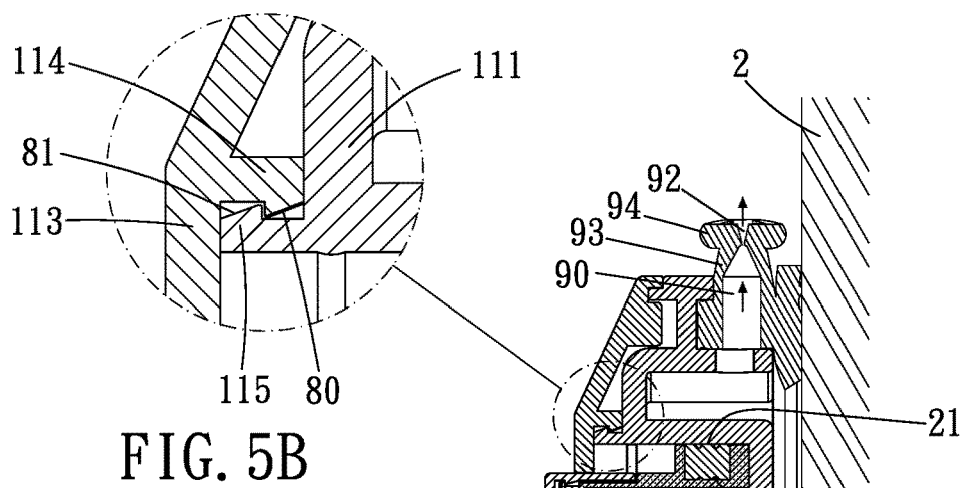
FIGS. 5A and 5B are partial enlargements of FIG. 5.
Figure 5A:
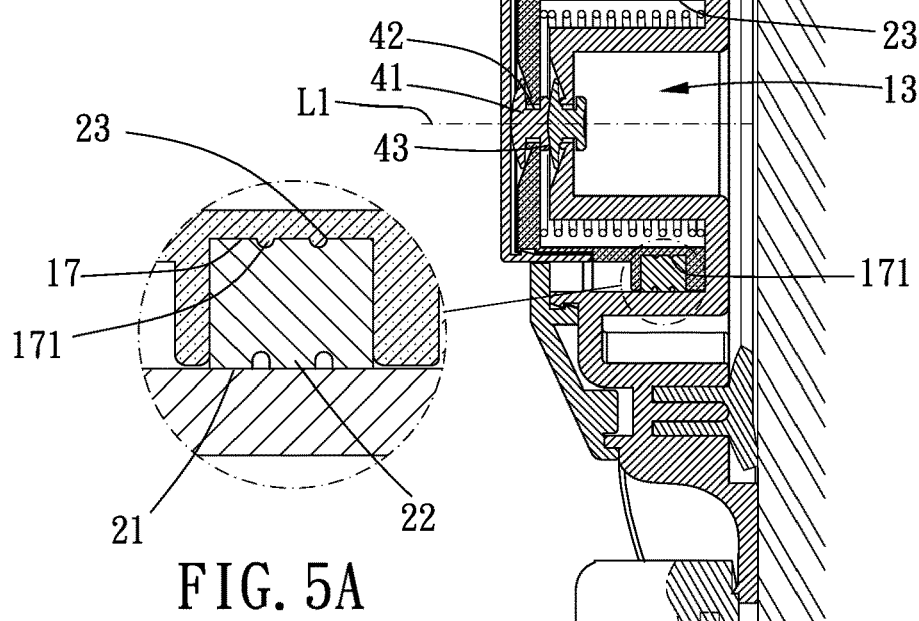
Figure 5:
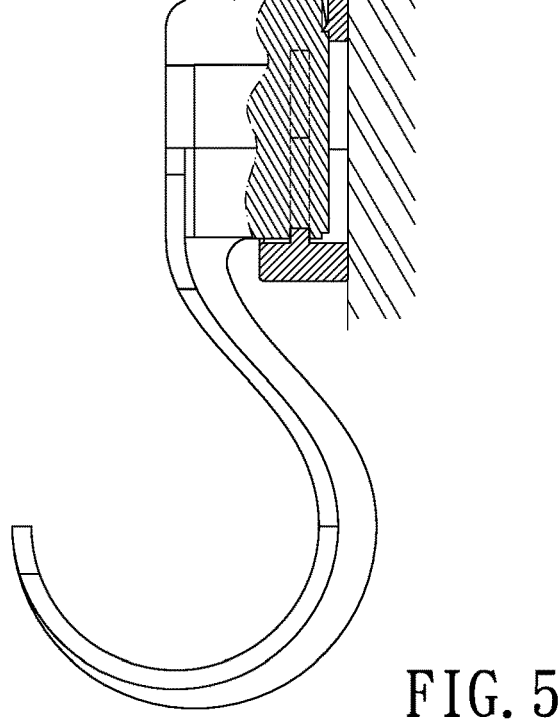
FIG. 5 is another schematic diagram of a preferable embodiment of the present invention in use.

Please refer to FIGS. 1 to 5 for a preferable embodiment of the present invention. A suction cup 1 of the present invention includes a suction member 10, a first check valve 30 and a second check valve 40.

The suction member 10 includes a seat body 11, a control member 12 which is movably disposed on the seat body 11, a first flow channel 15 and a second flow channel 16. The seat body 11 includes a seat portion 111 and a cup portion 112 which is elastically deformable and disposed on the seat portion 111, and the cup portion 112 is configured to contact a surface 2. The seat body 11 has a first gas chamber 13, a second gas chamber 14 is defined between the control member 12 and the seat body 11, and the first flow channel 15 is communicated with the first gas chamber 13 and the second gas chamber 14. The control member 12 has the second flow channel 16. The first check valve 30 is disposed within the first flow channel 15 and openably closes the first flow channel 15. The first check valve 30 allows fluid to flow from the first gas chamber 13 to the second gas chamber 14. The second check valve 40 is disposed within the second flow channel 16 and openably closes the second flow channel 16. The second check valve 40 allows fluid to flow from the second gas chamber 14 to an outside of the suction cup 1. Therefore, the fluid in the first gas chamber 13 and the second gas chamber 14 is exhausted unidirectionally due to the first and second check valve 30, 40, so as to increase suction ability, and the control member 12 is not easy to be moved toward a direction away from the cup portion 112 due to external force under a negative pressure (for example, the pressure is 0.533 bar). In this embodiment, an elastic member 50 is elastically abutted against and between the control member 12 and the seat portion 111 so as to elastically push the control member 12. Specifically, the control member 12 is not easy to be moved toward a direction to which the elastic member 50 pushes under the negative pressure (for example, the pressure is 0.533 bar). The fluid may be gas or liquid. In this embodiment, the cup portion 112 is made of silicone rubber and elastically deformable.

In this embodiment, the first check valve 30 and the second check valve 40 are the same, and only detail features of the second check valve 40 are described in the following description. The first check valve and the second check valve may be different in other embodiments. The second check valve 40 includes a top section 41, a neck section 42 and a bottom section 43. The neck section 42 is penetrated through the second flow channel 16, the top section 41 is sealingly covered on a first end opening 161 of the second flow channel 16, and the bottom section 43 is sealingly covered on a second end opening 162 of the second flow channel 16 which is opposite to the first end opening 161. The bottom section 43 is cross-shaped and has a plurality of sealing pieces 44 which are transvers to one another and deformable for preferable sealing effect. Furthermore, the first check valve 30 and the second check valve 40 are respectively made of deformable materials so that the bottom section 43 can be deformed to seal or unseal the second end opening 162 and allow the fluid to flow unidirectionally.

The control member 12 further includes an annular blocking member 20 which is annularly abutted against the seat portion 111. The control member 12 further has an annular groove 17, and the annular blocking member 20 is disposed within the annular groove 17. The annular blocking member 20 is abutted against and between the annular groove 17 and the seat portion 111 so as to prevent the annular blocking member 20 from sliding relative to the control member 12 and have preferable airtight effect between the control member 12 and the seat portion 111. In this embodiment, the annular blocking member 20 is a ring which is detachably sleeved on the control member 12, and the ring is made of an elastic and deformable material. In other embodiments, the annular blocking member may be integrally formed as a part of the control member. Specifically, the annular blocking member 20 has a peripheral surface 21, and the peripheral surface 21 has at least one outer convex ring 22 which is annularly abutted against an inner wall of the seat portion 111 so that the control member 12 is tightly fitted to the inner wall of the seat portion 111 for preferable airtight effect. In this embodiment, the peripheral surface 21 has a plurality of outer convex rings 22 which are spaced form one another for smooth movement and airtight effect. The annular blocking member 20 has an inner ring surface 23 corresponding to the peripheral surface 21, and the annular groove 17 has a plurality of annular flanges 171 which are radially abutted against the inner ring surface 23 so that each of the plurality of the outer convex rings 22 of the peripheral surface 21 is tightly fitted to the inner wall of the seat portion 111 to increase airtight effect.

The suction cup 1 further includes a cap 60, and the cap 60 is disposed on the control member 12 and covers the second check valve 40 so as to protect the second check valve 40 from being departed from the second flow channel 16 due to external force. Preferably, at least one outlet channel 70 is formed between the cap 60 and the control member 12, and each of the at least one outlet channel 70 is communicated with the second flow channel 16 and the outside of the suction cup 1. In this embodiment, a plurality of outlet channels 70 are formed between the cap 60 and the control member 12, and the control member 12 has the plurality of outlet channels 70. Each of the plurality of outlet channels 70 has a first outlet segment 71 and a second outlet segment 72 which is transverse to the first outlet segment 71, which is conductive to fluid exhaust. Specifically, an axial cross-section of the control member 12 is inverted U-shaped. The control member 12 has a top surface 121 and a circumferential surface 122. Each of the plurality of outlet channels 70 further has a third outlet segment 73 which is transverse to the second outlet segment 72. The top surface 121 has the first outlet segment 71 and the circumferential surface 122 has the second outlet segment 72, and the control member 12 and the cap 60 form the third outlet segment 73 so as to smoothly guide the fluid to discharge. In other embodiments, a number of outlet segments of each of the outlet channels can be different according to various requirements.

The control member 12 includes an indicating segment 123, and the control member 12 is movable relative to the seat body 11 so that the indicating segment 123 can come into or be revealed out of the seat body 11. A level of vacuum can be identified by a level of the indicating segment 123 revealed outside the seat body 11. For example, the indicating segment 123 is gradually revealed out of the seat body 11, which indicates that the level of vacuum is decreasing. In this embodiment, the indicating segment 123 is colored. Specifically, the control member 12 is colored. The cap 60 covers part of the control member 12 and the indicating segment 123 is revealed out of the cap 60. The indicating segment 123 is a part of the control member 12, and the control member 12 and the indicating segment 123 are colored when being integrally formed, which is convenient to manufacture and process, and the indicating segment 123 will not depart from the control member 12. In this embodiment, the indicating segment 123 is an annular projection. In other embodiments, the indicating segment may be a color mark processed on the control member. The indicating segment 123 does not be revealed out of the seat body 11 under the negative pressure, which can provide accurate observation of the level of vacuum.

Moreover, the cap 60 has at least one first assembling structure 61, and the control member 12 has at least one second assembling structure 124 which is assembled with the at least one first assembling structure 61. In this embodiment, the cap 60 has a plurality of first assembling structures 61 and the control member 12 has a plurality of second assembling structures 124, and each of the plurality of first assembling structures 61 is assembled with one of the plurality of second assembling structures 124 so as to be tightly connected with each other. In other embodiments, each of the plurality of first assembling structures and each of the plurality of second assembling structure may respectively be external and internal threads which are screwed with each other.

The seat body 11 further includes a cover portion 113, and the cover portion 113 is coveringly disposed on the seat portion 111. The cover portion 113 has at least one first locking portion 114, and the seat portion 111 has at least one second locking portion 115 which is engageable with the at least one first locking portion 114. The cover portion 113 further has a through hole 116, and the control member 12 is movably penetrated through the through hole 116 so that the cover portion 113 is not easy to depart from the seat body 11. In this embodiment, the cover portion 113 has a plurality of first locking portions 114, and the seat portion 111 has a plurality of second locking portions 115. The through hole 116 and the control member 12 are coaxial and define a center axis L1, and the plurality of first locking portions 114 and the plurality of second locking portions 115 are respectively disposed around the center axis L1 for preferable connection. Furthermore, at least one of respective one of the first locking portions 114 and respective one of the second locking portions 115 has a guiding incline, and the guiding incline is tilted away from the center axis L1 in a radial direction of the center axis L1 for easy assembly. In this embodiment, each of the first locking portions 114 and the second locking portions 115 has the guiding incline 80, 81, the guiding incline 80 of each of the first locking portions 114 and the guiding incline 81 of each of the second locking portions 115 are respectively radially tilted away from the center axis L1 in a direction from the cover portion 113 toward the seat portion 111.

Furthermore, the seat body 11 further has a gas inlet channel 90, and the gas inlet channel 90 is communicated between the first gas chamber 13 and the outside of the suction cup 1. The cup portion 112 further has a relief valve 91, and the relief valve 91 has an aperture 92 which is communicated with the gas inlet channel 90 and a wall which forms the gas inlet channel 90 and the aperture 92, and the wall is deformable to close or unclose the aperture 92. Specifically, the relief valve 91 further includes a base portion 93, an oval ring 94 and a plurality of ribs 95 which extend radially. Each of the plurality of ribs 95 is connected to and between the oval ring 94 and the base portion 93, and the base portion 93 has the aperture 92. Through pressing two opposite sides of the oval ring 94, the base portion 93 is deformable to unclose the aperture 92 for decompression and prevented from being overly deformed. In other embodiments, the oval ring may be round, square or polygonal.

The suction cup 1 further includes a hook 19, and one of the seat body 11 and the hook 19 has a first engaging structure, and the other has a second engaging structure. In this embodiment, the seat body 11 has the first engaging structure 18, and the hook 19 has the second engaging structure 191. The first engaging structure 18 includes an engaging hole 181 and a convex piece 182 which defines the engaging hole 181. The engaging hole 181 is open to two opposite sides. The second engaging structure 191 has a recessing groove 192. A shape of the second engaging structure 191 corresponds to a shape of the engaging hole 181, and the second engaging structure 191 is insertable within the engaging hole 181 and the convex piece 182 is embedded within the recessing groove 192. Specifically, the second engaging structure 191 is a tongue member. The second engaging structure 191 includes a wide section 193 and a narrow section 194, and the wide section 193 and the narrow section 194 are respectively abutted against the convex piece 182 for preferable combination.

In operation, the control member 12 is pressed and moved relative to the seat body 11, the second check valve 40 is deformed by a pressure in the second gas chamber 14 and the second flow channel 16 is opened, and the fluid can be exhausted from the second gas chamber 14 to form an air-tight state. The fluid in the first gas chamber 13 is forwarded to flow by a pressure difference between the first gas chamber 13 and the second gas chamber 14, which results in deformation of the first check valve 30 (the first check valve 30 is pushed in this embodiment). Therefore, the fluid can flow into the second gas chamber 14 to achieve vacuum effect and have preferable suction ability.

In summary, the suction cup has preferable airtight effect through the first check valve and the second check valve. Moreover, the control member is not easy to be moved by the elastic member and reveal the indicating segment under the negative pressure.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A suction cup, including:
   a suction member, including a seat body, a control member which is movably disposed on the seat body, a first flow channel and a second flow channel, the seat body including a seat portion and a cup portion which is elastically deformable and disposed on the seat portion, the cup portion being configured to contact a surface, the seat body having a first gas chamber, a second gas chamber being defined between the control member and the seat body, the first flow channel being communicated with the first gas chamber and the second gas chamber, the control member having the second flow channel;
   a first check valve, disposed within the first flow channel and openably closing the first flow channel, the first check valve allowing fluid to flow from the first gas chamber to the second gas chamber;
   a second check valve, disposed within the second flow channel and openably closing the second flow channel, the second check valve allowing fluid to flow from the second gas chamber to an outside of the suction cup; and
   a cap, disposed on the control member and covering the second check valve.

2. The suction cup of claim 1, wherein the control member further includes an annular blocking member which is annularly abutted against the seat portion.

3. The suction cup of claim 2, wherein the control member further has an annular groove, the annular blocking member is disposed within the annular groove, the annular blocking member is abutted against and between the annular groove and the seat portion, the annular blocking member has a peripheral surface, and the peripheral surface has at least one outer convex ring which is annularly abutted against an inner wall of the seat portion.

4. The suction cup of claim 3, wherein the control member includes an indicating segment, the control member is movable relative to the seat body so that the indicating segment can come into or be revealed out of the seat body; the indicating segment is colored; a plurality of outlet channels are formed between the cap and the control member, each of the plurality of outlet channels is communicated with the second flow channel and the outside of the suction cup; the cap has a plurality of first assembling structures, the control member has a plurality of second assembling structures, and each of the plurality of first assembling structures is assembled with one of the plurality of second assembling structures; the seat body further includes a cover portion, the cover portion is coveringly disposed on the seat portion, the cover portion has a plurality of first locking portions, the seat portion has a plurality of second locking portions which are engageable with the plurality of first locking portions, the cover portion further has a through hole, the control member is movably penetrated through the through hole; the through hole and the control member are coaxial and define a center axis, the plurality of first locking portions and the plurality of second locking portions are respectively disposed around the center axis; at least one of respective one of the first locking portions and respective one of the second locking portions has a guiding incline, the guiding incline is tilted away from the center axis in a radial direction of the center axis; the seat body further has a gas inlet channel, the gas inlet channel is communicated between the first gas chamber and the outside of the suction cup, the cup portion further has a relief valve, the relief valve has an aperture which is communicated with the gas inlet channel and a wall which forms the gas inlet channel and the aperture, and the wall is deformable to close or unclose the aperture; the control member has the plurality of outlet channels, and each of the plurality of outlet channels has a first outlet segment and a second outlet segment which is transverse to the first outlet segment; the control member is colored, the cap covers part of the control member and the indicating segment is revealed out of the cap; an elastic member is elastically abutted against and between the control member and the seat portion; the peripheral surface has a plurality of outer convex rings, the annular blocking member has an inner ring surface corresponding to the peripheral surface, the annular groove has a plurality of annular flanges which are radially abutted against the inner ring surface; the first check valve and the second check valve are the same, the second check valve includes a top section, a neck section and a bottom section, the neck section is penetrated through the second flow channel, the top section is sealingly covered on a first end opening of the second flow channel, the bottom section is sealingly covered on a second end opening of the second flow channel which is opposite to the first end opening; the bottom section is cross-shaped, the bottom section has a plurality of sealing pieces which are transverse to one another; the suction cup further includes a hook, one of the seat body and the hook has a first engaging structure and the other has a second engaging structure, the first engaging structure includes an engaging hole and a convex piece which defines the engaging hole, the engaging hole is open to two opposite sides, the second engaging structure has a recessing groove, a shape of the second engaging structure corresponds to a shape of the engaging hole, the second engaging structure is insertable within the engaging hole and the convex piece is embedded within the recessing groove.

5. The suction cup of claim 1, wherein the control member includes an indicating segment, and the control member is movable relative to the seat body so that the indicating segment can come into or be revealed out of the seat body.

6. The suction cup of claim 5, wherein the indicating segment is colored.

7. The suction cup of claim 1, wherein at least one outlet channel is formed between the cap and the control member, and each of the at least one outlet channel is communicated with the second flow channel and the outside of the suction cup.

8. The suction cup of claim 1, wherein the cap has at least one first assembling structure, and the control member has at least one second assembling structure which is assembled with the at least one first assembling structure.

9. The suction cup of claim 1, wherein the seat body further includes a cover portion, the cover portion is coveringly disposed on the seat portion, the cover portion has at least one first locking portion, the seat portion has at least one second locking portion which is engageable with the at least one first locking portion, the cover portion further has a through hole, and the control member is movably penetrated through the through hole.

* * * * *